United States Patent
Roe et al.

(10) Patent No.: US 9,958,358 B2
(45) Date of Patent: May 1, 2018

(54) CONTROL SYSTEM HAVING SEAL DAMAGE COUNTING

(71) Applicant: Caterpillar Inc., Peoria, IL (US)

(72) Inventors: Austin Paul Roe, Morton, IL (US); Anthony T. Petrou, Peoria, IL (US); Kevin J. D'Sa, Dunlap, IL (US); Jay H. Cline, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 226 days.

(21) Appl. No.: 15/087,397

(22) Filed: Mar. 31, 2016

(65) Prior Publication Data

US 2017/0284898 A1    Oct. 5, 2017

(51) Int. Cl.

| | |
|---|---|
| *G01M 15/05* | (2006.01) |
| *F02F 1/16* | (2006.01) |
| *F02F 1/00* | (2006.01) |
| *G01M 15/04* | (2006.01) |
| *F02F 11/00* | (2006.01) |

(52) U.S. Cl.
CPC ............ *G01M 15/05* (2013.01); *F02F 1/004* (2013.01); *F02F 1/16* (2013.01); *F02F 11/005* (2013.01); *G01M 15/048* (2013.01)

(58) Field of Classification Search
CPC ........ G01M 15/05; G01M 15/048; F02F 1/16; F02F 1/004; F02F 11/005
See application file for complete search history.

(56) References Cited

U.S. PATENT DOCUMENTS

| | | | | |
|---|---|---|---|---|
| 4,385,595 A | * | 5/1983 | Shaw ........................ | F02F 1/16 123/193.2 |
| 5,115,771 A | * | 5/1992 | Ozawa ...................... | F01P 3/02 123/193.2 |
| 5,402,754 A | * | 4/1995 | Gunnarsson .............. | F02F 1/16 123/193.2 |
| 5,582,155 A | * | 12/1996 | Knopp .................... | F02B 29/00 123/25 C |

(Continued)

FOREIGN PATENT DOCUMENTS

CN   101593228 A   12/2009

OTHER PUBLICATIONS

SAE International, "Piston Bowl Rim Cracks—A More Detailed Analysis", pdfcowd.com, pp. 1-2.

(Continued)

*Primary Examiner* — Khoi H Tran
*Assistant Examiner* — Majdi Alsomiri

(57) ABSTRACT

An imbedded control system is disclosed for use with an engine having a cylinder liner and a seal. The control system may have at least one sensor configured to generate a signal indicative of a combustion process occurring inside the cylinder liner, and a controller in communication with the sensor. The controller may be configured to determine an amount of heat generated inside the cylinder liner based on the signal and a combustion model of the engine, to determine a heat flux through the engine based on the amount of heat and a heat flux model of the engine, and to determine a temperature at the seal based on the heat flux and a thermal model of the cylinder liner. The controller may also be configured to track a time at the temperature, and to determine a damage count of the seal based on the time at the temperature.

20 Claims, 4 Drawing Sheets

(56) References Cited

U.S. PATENT DOCUMENTS

| | | | | |
|---|---|---|---|---|
| 5,877,428 A * | 3/1999 | Scolton | G01N 3/08 | 73/822 |
| 5,931,140 A * | 8/1999 | Maloney | F02D 41/0072 | 123/480 |
| 5,979,374 A * | 11/1999 | Jackson | F02F 1/163 | 123/193.2 |
| 6,328,001 B1 * | 12/2001 | Kirtley | F02B 23/0696 | 123/193.3 |
| 6,357,400 B1 * | 3/2002 | Bedwell | F02F 1/16 | 123/41.81 |
| 6,941,245 B2 * | 9/2005 | Longnecker | F01P 7/167 | 702/184 |
| 7,334,546 B2 * | 2/2008 | Rasmussen | F02F 1/004 | 123/41.84 |
| 7,409,928 B2 | 8/2008 | Rizoulis et al. | | |
| 7,977,952 B2 * | 7/2011 | Krutz | G01N 33/44 | 324/548 |
| 8,601,995 B2 * | 12/2013 | Worthington | F02F 1/004 | 123/193.2 |
| 2007/0227475 A1 * | 10/2007 | Hiramitsu | F02F 1/16 | 123/41.72 |
| 2008/0163848 A1 * | 7/2008 | Lemke | F02B 75/28 | 123/197.3 |
| 2009/0007775 A1 * | 1/2009 | Seymour | F01P 7/165 | 92/149 |
| 2010/0292909 A1 * | 11/2010 | Gwidt | F02D 41/401 | 701/103 |
| 2011/0031103 A1 * | 2/2011 | Deckman | B01D 53/04 | 203/41 |
| 2011/0137575 A1 | 6/2011 | Koul | | |
| 2011/0246048 A1 * | 10/2011 | Fujii | F02D 41/08 | 701/104 |
| 2011/0269911 A1 * | 11/2011 | Morita | C08F 214/22 | 525/326.2 |
| 2012/0240883 A1 * | 9/2012 | McGiffin | F02F 1/16 | 123/41.72 |
| 2013/0073173 A1 * | 3/2013 | Hellstrom | F02D 35/025 | 701/101 |
| 2013/0139768 A1 * | 6/2013 | Takemoto | F01M 1/08 | 123/41.02 |
| 2014/0074381 A1 * | 3/2014 | Sczomak | F02D 41/1454 | 701/105 |
| 2014/0182282 A1 * | 7/2014 | Kamen | F16J 15/52 | 60/517 |
| 2014/0352645 A1 * | 12/2014 | Burkhard | F02F 1/08 | 123/193.3 |
| 2015/0059690 A1 | 3/2015 | Svensson et al. | | |
| 2015/0059691 A1 * | 3/2015 | Hergart | F02D 41/22 | 123/349 |
| 2015/0176506 A1 * | 6/2015 | Miyazono | F02D 15/04 | 123/48 A |
| 2015/0233788 A1 * | 8/2015 | Cline | G01M 13/005 | 73/49.8 |
| 2015/0345421 A1 | 12/2015 | Gniesmer | | |
| 2016/0053709 A1 * | 2/2016 | Batta | F02F 1/004 | 123/193.2 |
| 2016/0053711 A1 * | 2/2016 | Batta | F02F 1/004 | 123/41.79 |
| 2016/0177862 A1 * | 6/2016 | Batta | F02F 1/004 | 123/41.01 |
| 2016/0356239 A1 * | 12/2016 | Graham | F02F 1/004 | |

OTHER PUBLICATIONS https://en.wikipedia.org/wiki/Thermo-mechanical_fatigue, pp. 1-2.

* cited by examiner

US 9,958,358 B2

CONTROL SYSTEM HAVING SEAL DAMAGE COUNTING

TECHNICAL FIELD

The present disclosure relates generally to a control system and, more particularly, to a control system having seal damage counting.

BACKGROUND

An internal combustion engine includes an engine block defining a plurality of cylinder bores, and pistons that reciprocate within the cylinder bores to generate mechanical power. Typically, each cylinder bore includes a liner that is clamped in place by an associated cylinder head and gasket. The liner has a cylindrical body that fits within the cylinder bore, and a radial flange at a top end of the body that supports the cylinder liner on the engine block. A cavity is formed within the engine block around the liner, and coolant is directed through the cavity to cool the liner. A seal is placed around the liner (i.e., between the liner and the engine block) to inhibit coolant from leaking out of the cylinder bore.

During operation of the engine, the combustion of fuel and air inside the cylinder liner generates heat, which passes through the liner and seal to be absorbed and carried away by the coolant. Over time, as engines are required to produce greater amounts of power more efficiently and/or with lower amounts of regulated pollutants, the amount of heat passing through the cylinder liner and seal has increased. In some applications, this heat amount is significant enough to prematurely degrade or even cause failure of the seal.

In order for engine components, such as seals, to be designed that can withstand extreme temperatures over an extended period of time, it can be important to understand the environment in which the components are intended to operate. One way to do this is disclosed in U.S. Patent Application Publication No. 2015/0059690 of Svensson et al. that published on Mar. 5, 2015 ("the '690 publication"). Specifically, the '690 publication discloses an engine system having an ambient module, an operational parameter sensor, and a controller communicably coupled to the ambient condition module and the operational parameter sensor. The controller is configured to receive an air pressure signal from the ambient condition module, and signals from the operational parameter sensor indicative of a fuel rate, a fuel injection timing, a fuel injection schedule, an engine speed, and an intake manifold temperature. The controller is further configured to correlate the signals with a pre-calibrated map to estimate a temperature of a valve, a piston, a liner, a cylinder head, and a pre-chamber of the engine, and to monitor the estimated temperatures over a predetermined period of time. When the estimated temperatures exceed a predetermined threshold, the controller is configured to derate the engine.

While the system of the '690 publication may help to prevent damage to an engine component caused by high temperatures, the system may lack applicability. In particular, the system may not be applicable to cylinder liner seals, and may not be useful during design and/or selection of a seal prior to use of the seal within the engine. In addition, the system may not provide information regarding a damage severity of the seal exposed to varying temperatures over varying durations, and may become less accurate as the engine wears. In addition, the system may not be useful across multiple configurations or platforms of engines.

The control system of the present disclosure solves one or more of the problems set forth above and/or other problems in the art.

SUMMARY

In one aspect, the present disclosure is directed to a control system imbedded within an engine having a cylinder liner disposed in a block and a seal located around the cylinder liner. The control system may include at least one sensor configured to generate a signal indicative of a combustion process occurring inside the cylinder liner, and a controller in communication with the sensor. The controller may be configured to determine an amount of heat generated inside the cylinder liner based on the signal and a combustion model of the engine, to determine a heat flux through the engine based on the amount of heat and a heat flux model of the engine, and to determine a temperature at the seal based on the heat flux and a thermal model of the cylinder liner. The controller may also be configured to track a time at the temperature, and to determine a damage count of the seal based on the time at the temperature.

In another aspect, the present disclosure is directed to a method of monitoring an engine by an imbedded control system. The method may include sensing at least one parameter of a combustion process occurring inside a cylinder liner of the engine, and determining an amount of heat generated inside the cylinder liner based on the at least one parameter, a known compression ratio of the engine, a known bore diameter of the cylinder liner, a known stroke length of an associated piston, an assumed mixing of fuel and air occurring inside the cylinder liner, and a combustion model of the engine. The method may also include determining a heat flux through the engine based on the amount of heat, known material and geometry data of the cylinder liner and the block, and a heat flux model of the engine. The method may further include determining a temperature of coolant in contact with a seal disposed around the cylinder liner, and determining a temperature at the seal based on the heat flux, a thermal model of the cylinder liner, and the temperature of the coolant. The method may additionally include tracking a time at the temperature, and determining in real-time a damage count of the seal based on the time at the temperature and a damage model of the seal.

DETAILED DESCRIPTION

Figure 1:
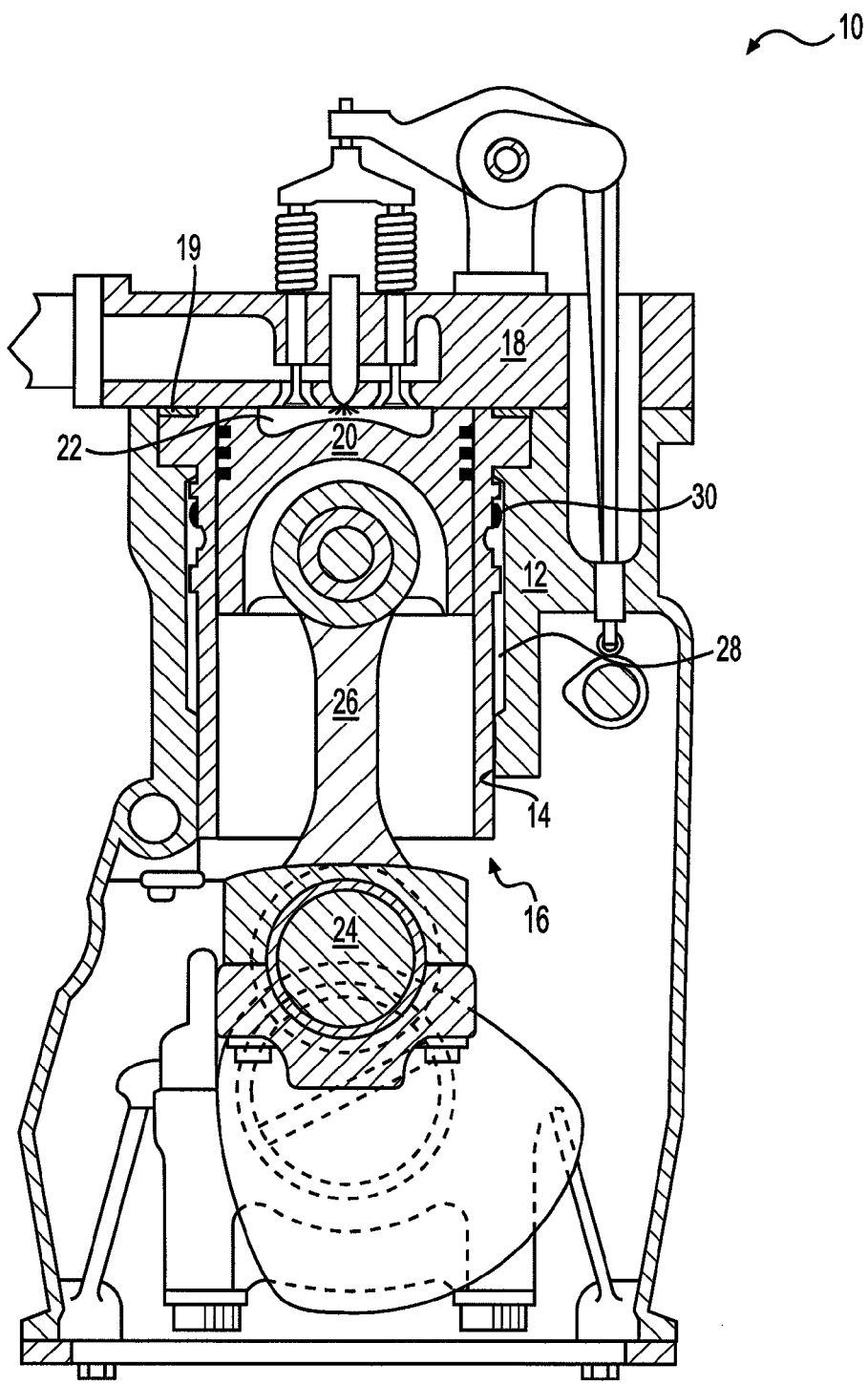
FIG. 1 is a cross-sectional and diagrammatic illustration of an exemplary disclosed engine.

FIG. 1 illustrates a portion of an exemplary internal combustion engine 10. Engine 10 may include a block 12 defining one or more bores 14. A hollow liner 16 may be disposed within each bore 14, and a head 18 may be connected (e.g., by way of a gasket 19) to block 12 to close off an end of bore 14 and liner 16. A piston 20 may be slidably disposed within liner 16, and piston 20 together with liner 16 and head 18 may define a combustion chamber 22. It is contemplated that engine 10 may include any number of combustion chambers 22 and that combustion chambers 22 may be disposed in an "in-line" configuration, in a "V" configuration, in an opposing-piston configuration, or in any other suitable configuration.

Piston 20 may be configured to reciprocate within liner 16 between a top-dead-center (TDC) position and a bottom-dead-center (BDC) position during a combustion event occurring with chamber 22. In particular, piston 20 may be pivotally connected to a crankshaft 24 by way of a connecting rod 26, so that a sliding motion of each piston 20 within cylinder liner 16 results in a rotation of crankshaft 24. Similarly, a rotation of crankshaft 24 may result in a sliding motion of piston 20. In a four-stroke engine, piston 20 may move through four full strokes to complete a combustion cycle of about 720° of crankshaft rotation. These four strokes include an intake stroke (TDC to BDC), a compression stroke (BDC to TDC), a power stroke (TDC to BDC), and an exhaust stroke (BDC to TDC). Fuel (e.g., diesel fuel, gasoline, gaseous fuel, etc.) may be injected into combustion chamber 22 during the intake stroke. The fuel may be mixed with air and ignited during the compression stroke. Heat and pressure resulting from the fuel/air ignition may then be converted to useful mechanical power during the ensuing power stroke. Residual gases may be discharged from combustion chamber 22 during the exhaust stroke.

The heat from the combustion process described above that could damage engine 10, if unaccounted for, may be dissipated by way of a coolant jacket 28. Coolant jacket 28 may be located between an internal wall of bore 14 and an external wall of liner 16. For example, coolant jacket 28 may be formed by a recess within block 12 at the internal wall of bore 14 and/or within the external wall of liner 16. It is contemplated that coolant jacket 28 may be formed completely within block 12 around liner 16, formed completely within liner 16, and/or formed by a hollow sleeve (not shown) that is brazed to either one of block 12 or liner 16, as desired. Water, glycol, or a blended mixture may be directed through coolant jacket 28 to absorb heat from block 12 and liner 16.

Figure 2:
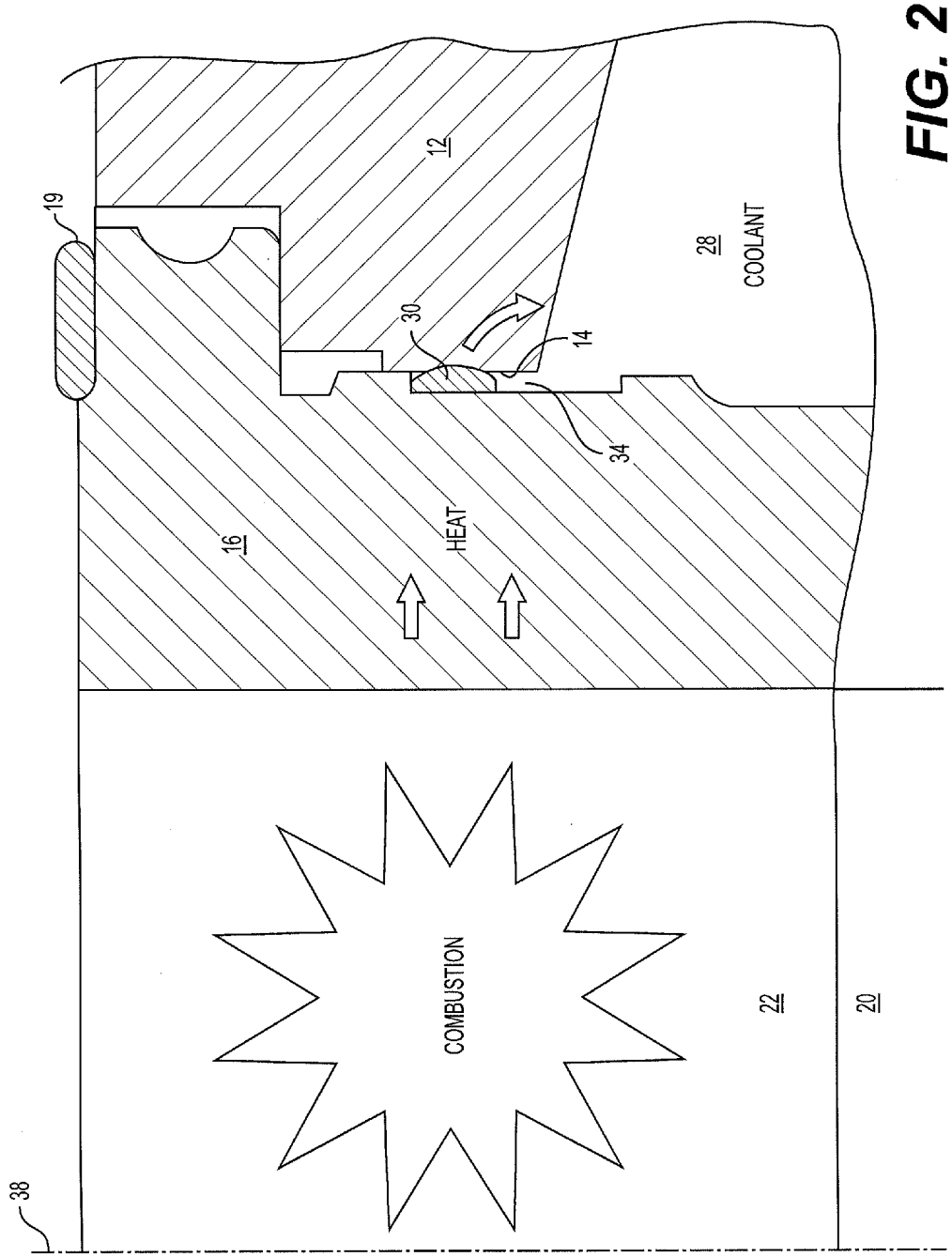
FIG. 2 is a cross-sectional illustration of an exemplary disclosed cylinder liner and seal that may be used in conjunction with the engine of FIG. 1.

As shown in FIG. 2, a seal 30 may be disposed around liner 16 to seal off an upper end of coolant jacket 28. Seal 30 may be sandwiched between an outer wall of liner 16 and an inner wall of bore 14, after assembly, such that coolant within coolant jacket 28 is inhibited from leaking out of block 12 through a top of bore 14. Seal 30 may be, for example, a ring-type (e.g., an O-ring or a D-ring) seal fabricated from an elastomeric and/or resilient material. Coolant jacket 28 may fluidly communicate with a lower half of seal 30 via an annular passage 34 formed by a difference of liner and bore diameters at an axial location below seal 30. This communication may help to cool seal 30. With this configuration, the coolant functions as a heat sink, causing combustion heat from inside liner 16 to pass radially outward through liner 16 and seal 30 in a direction toward the coolant.

Figure 3:
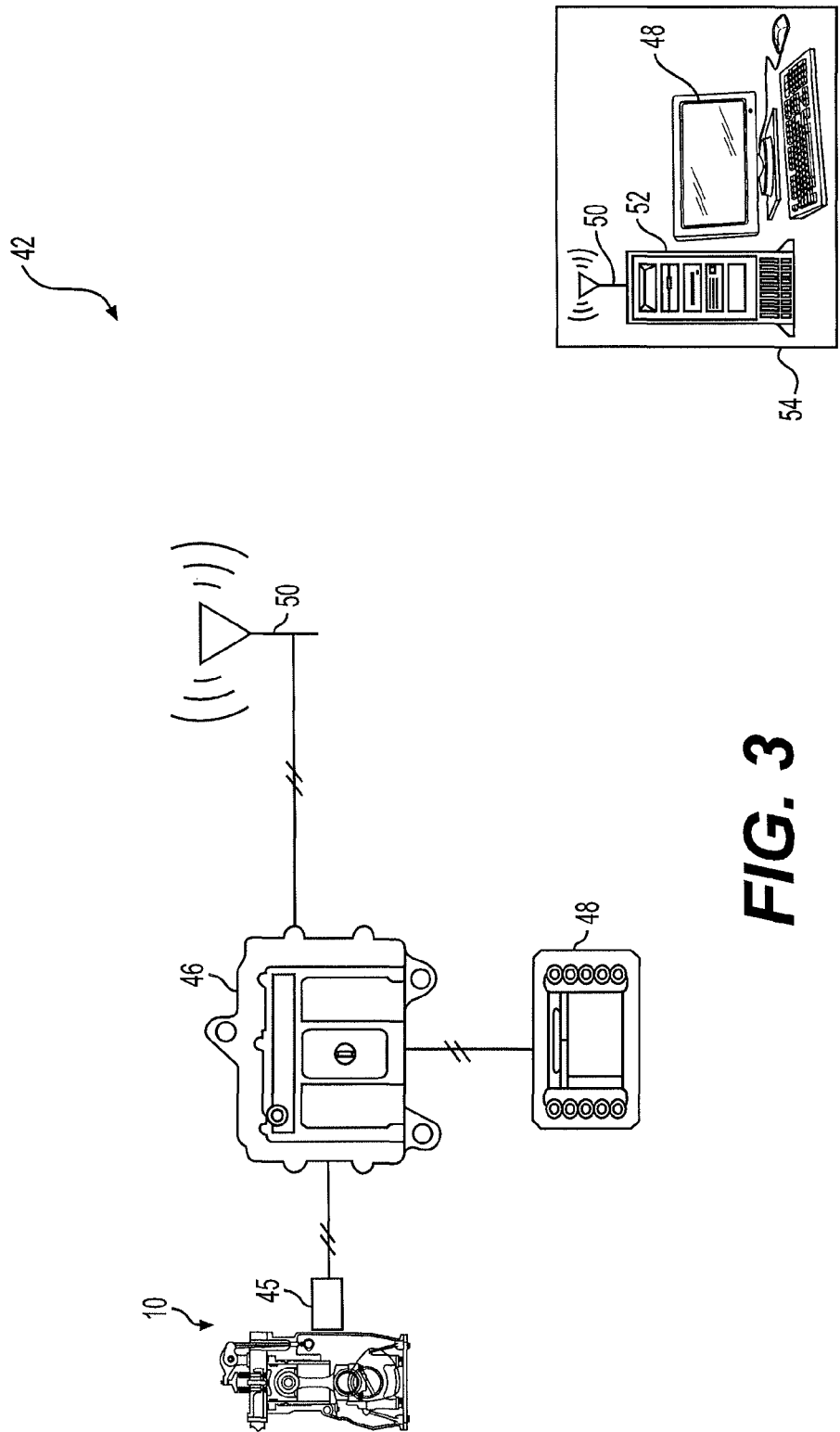
FIG. 3 is a diagrammatic illustration of an exemplary disclosed control system that may be used in conjunction with the engine of FIG. 1 to determine a damage count of the seal of FIG. 2.

As shown in FIG. 3, a control system 42 may be provided for use in monitoring thermal damage of engine 10 caused by the heat flux described above. Control system 42 may include, among other things, at least one sensor 45 and a controller 46. As will be described in more detail below, controller 46 may be configured to determine in real-time a temperature at seal 30 (and a corresponding damage count caused by the temperature being elevated for a period of time) based on signals from sensor(s) 45 and using one or more models stored in memory.

Sensor(s) 45 may be configured to generate signals indicative of parameter values associated with the combustion process occurring inside engine 10. Any number and types of sensor(s) 45 may be used for this purpose. In the disclosed exemplary embodiment, the signals generated by sensor(s) 45 include a speed of engine 10 (e.g., a rotational speed of crankshaft 24), a quantity of fuel being injected into liner 16 during each combustion cycle, a timing of the fuel being injected, a pressure of the fuel being injected, a flow rate of air entering liner 16 during each combustion cycle, a temperature of the air, a pressure of the air, and a temperature of the coolant surrounding liner 16. In some embodiments, sensor(s) 45 may be existing sensors already being used for other or additional purposes. In other embodiments, sensor(s) 45 may be dedicated sensors used only for damage-counting purposes. Regardless, the signals generated by sensor(s) 45 may be directed to controller 46 for further processing.

It is contemplated that any one or more of sensor(s) 45 described above may embody virtual sensors rather than physical sensors, if desired. A virtual sensor may produce an algorithm-driven estimated value based on one or more other known or measured values. For example, based on a known or measured operating speed, fuel quantity, injection timing, fuel pressure, air flow rate, air temperature, air pressure, coolant temperature, or other parameter of engine 10, a model, table, and/or equation may be referenced to estimate another of the operating parameters. As a result, the value of any signal described above as being directed from sensor 45 to controller 46 may be estimated rather than directly measured. It is contemplated that instead of a separate element performing these estimations, the virtual sensing functions could be accomplished by controller 46, itself, if desired.

Controller 46 may include means for monitoring, recording, storing, indexing, processing, communicating and/or controlling various engine operations. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

In addition to controller 46, in some embodiments, system 42 may also include a display 48 and/or a communications device 50 allowing for communication with a local operator and/or another controller 52 located at a back office 54. In some embodiments, system 42 includes both display 48 and communications device 50. Controller 46 may be in communication with each of these other components and/or with controller 52 at back office 54 (e.g., via a communication device 50), and configured to determine, based on signals from these components and based on other known information stored in memory, a damage count of seal 30 and/or instructions regarding servicing or replacement of seal 30.

Display 48 may include one or more monitors (e.g., a liquid crystal display (LCD), a cathode ray tube (CRT), a personal digital assistant (PDA), a plasma display, a touch-screen, a portable hand-held device, or any such display device known in the art) configured to actively and responsively show a damage count of seal 30, related recommendations, warnings, instructions, etc. to an operator of engine 10. Display 48 is typically disposed in close proximity to controls of engine 10 and/or within the view of the operator. However, in some applications, display 48 could be located remotely (e.g., at back office 54), if desired. Display 48 may be connected to controller 46 (or controller 52), and controller 46 may execute instructions to render graphics and images on display 48.

Communications device 50 may be configured to facilitate communication between controller 46 and controller 52. Communications device 50 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, controller 46 may be omitted, and controller 52 may communicate directly with sensor(s) 45 and/or display 48 via communications device 50, if desired. Other means of communication may also be possible.

Figure 4:
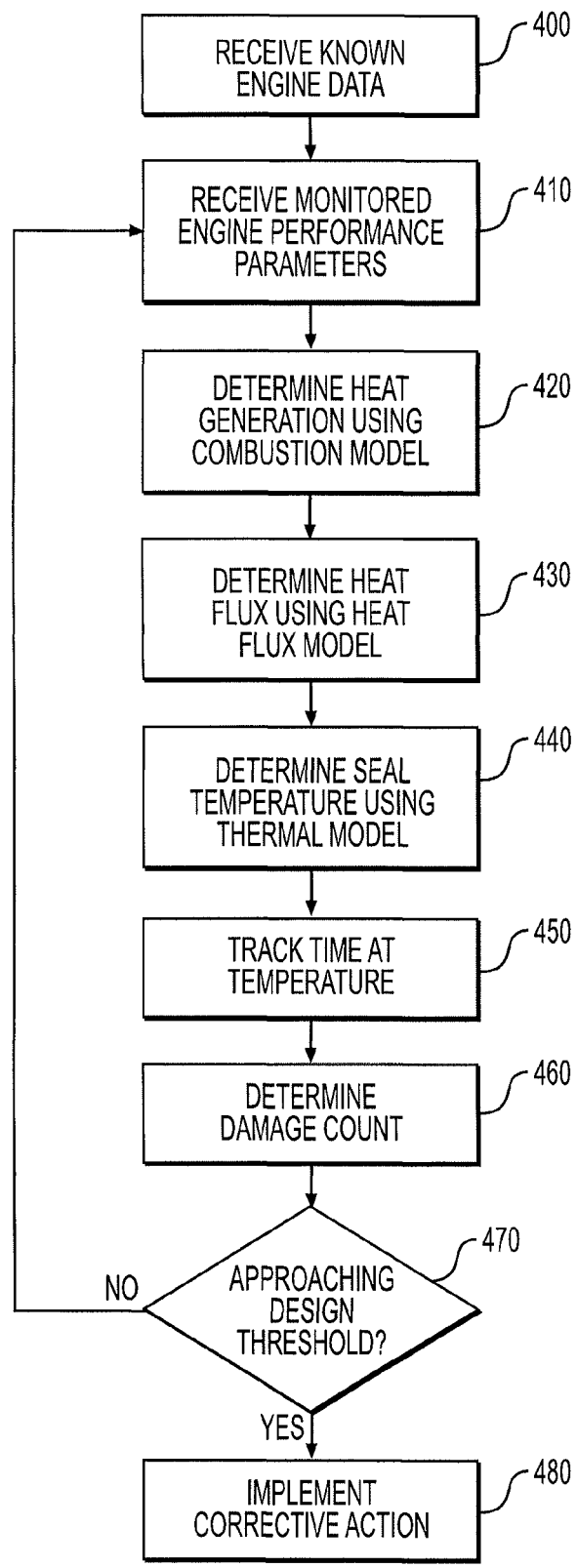
FIG. 4 is a flowchart depicting an exemplary method of damage counting that may be performed by the control system of FIG. 3.

Controllers 46 and/or 52, based on the information received from sensor(s) 45, can be configured to execute instructions stored on computer readable medium to perform methods of engine monitoring (e.g., damage counting) and control. An exemplary method that can be performed by controllers 46 and/or 52 is illustrated in FIG. 4, and will be explained in more detail in the following section to further illustrate the disclosed concepts.

INDUSTRIAL APPLICABILITY

The disclosed system may be used in any application where it is desired to increase the reliability of an associated engine. The disclosed system may increase engine reliability by tracking a damage count of liner seal 30, and selectively responding when the damage becomes excessive. Operation of system 42 will now be described with reference to FIG. 4.

At one or more points in the life cycle of engine 10, controller 46 of system 42 may receive known data regarding a current configuration of engine 10 (Step 400). This data may be manually or automatically loaded into the memory of controller 46 during manufacture of engine 10, loaded into the memory at any time that the hardware of engine 10 is modified or replaced, and/or updated throughout the life of engine 10 as engine 10 wears or is serviced. The data may include, among other things, the general component consist of engine 10, physical parameters (e.g., shapes, sizes, material properties such as coefficients of heat transfer, etc.) of the components, and/or relationships (e.g., a compression ratio, a bore stroke, valve timings, etc.) between the components. For example, when engine 10 is manufactured, physical parameters of a particular liner 16 assembled into engine 10 may be loaded into controller 46. Thereafter, when the particular liner 16 is replaced with another liner 16 having a different shape, size, or material property, corresponding physical parameters may be updated within the memory of controller 46. It is also contemplated that, as the particular liner 16 wears over a period of engine operation and associated parameters change (e.g., a radial wall thickness decreases), those parameters could be manually and/or automatically updated to reflect the changes. In another example, the known data received by controller 46 may be associated with the various fluids (fuel, lubrication, coolant, air, etc.) inside engine 10. In this example, the known data could include a makeup, concentration, quality, or other fluid parameter known in the art.

During operation of engine 10, controller 46 may continuously (e.g., at a rate of about 0.01 to 100 Hz, typically 1 Hz) receive values of monitored engine performance parameters (Step 410). These values may be in the form of signals generated by one or more of sensor(s) 45. As described above, the performance parameters may be representative of factors influencing the combustion process occurring inside liner 16, and include an engine speed, an injected fuel quantity, an injection timing, an injection pressure, an air flow rate, an air temperature, an air pressure, and a coolant temperature.

Based on the known data received at step 400 and the measured data received at step 410, controller 46 may reference a combustion model stored in memory to determine an amount of heat generated during the combustion process inside liner 16 (Step 420). The combustion model may relate an amount of chemical energy being directed into engine 10 at any given point in time, along with a conversion efficiency of engine 10, to a resulting heat energy amount. It is important to note that the combustion model used in step 420 may be a general model, which is made specific to engine 10 using the known data received at step 400. Accordingly, the same combustion model may be used on different engines and/or in the same engine with different component configurations, as long as the known data is updated to reflect the corresponding physical differences. In this way, the disclosed system may have broad applicability.

Controller 46 may use the output of the combustion model to determine a heat flux through liner 16 using a heat flux model stored in memory (Step 430). The heat flux model may indicate how much of the heat energy generated inside liner 16 exits engine 10 by way of increased temperature of the surrounding components. More specifically, the heat flux model may indicate how much of the heat energy generated inside liner 16 passes radially outward through liner 16 and seal 30 toward the coolant in jacket 28. The heat flux model may rely on convection and radiation, as represented via EQ. 1 and EQ. 2 below, respectively:

$$q''_{conv} = h(T_H - T_L) \quad \text{EQ. 1}$$

$$q''_{rad} = \epsilon\sigma(T_H^4 - T_L^4) \quad \text{EQ. 2}$$

wherein:

$q''_{conv}$ is the heat flux into liner 16 from convection;
$q''_{rad}$ is the heat flux into liner 16 from radiation;
h is the heat transfer coefficient of liner 16;
$\epsilon$ is the emissivity coefficient;
$\sigma$ is the Stefan Boltzman constant;
$T_H$ is the temperature of combustion gas inside liner 16; and
$T_L$ is the wall temperature of liner 16.

In equations EQ. 1 and EQ. 2 above, the heat transfer coefficient h may be determined as a function of known material properties of liner 16 received at step 400 and a speed (e.g., a mean speed) of engine 10 measured at step 410. The temperature $T_H$ may be determined as a function of the Ideal Gas Equation and the output from the combustion model (i.e., the amount of chemical energy from the injected fuel converted to heat energy). The liner wall temperature $T_L$ may be held at a constant value (e.g., about 420° K.) in order to provide stability in the heat flux model. Using EQ. 1 and EQ. 2 in the manner described above, the heat flux may be determined for only closed-chamber conditions. Closed-chamber conditions may occur during only the compression and power strokes, when any associated valves (e.g., exhaust and/or intake valves—not shown) are in flow-blocking positions.

In order to accurately determine heat loading of seal 30, however, the heat flux model should account for an amount of heat passing through liner 16 and seal 30 during all 720° of the combustion cycle. In order to do this, the cylinder gas temperatures must be estimated during the times when combustion chamber 22 is open. Intake valve closing and exhaust valve opening times may be different for each engine 10 and/or engine configuration, and provided for the particular engine configuration at step 400 described above.

The heat flux occurring during the intake and exhaust strokes of the combustion cycle (i.e., when the intake and/or exhaust valves are open) may also be determined use equations EQ. 1 and EQ. 2 above. However, when calculating heat flux during the intake stroke, instead of using the cylinder gas temperature $T_H$ in the equations, an air temperature (e.g., an inlet manifold temperature—as measured by sensor 45 at step 410) may instead by utilized. Likewise, when calculating heat flux during the exhaust stroke, instead of using the cylinder gas temperature $T_H$ described above, a previously calculated cylinder gas temperature (e.g., a temperature calculated at a last closed-chamber crank angle just prior to the exhaust valve opening) may instead be utilized throughout the exhaust stroke. Controller 46 may then sum the convection and radiation heat flux values at every angle of crankshaft rotation, integrate the sum over the 720° of the cycle, and then average the integral over the 720°.

Controller 46 may then determine a temperature at seal 30 using the heat flux calculated at step 430 and a thermal model stored in memory (Step 440). In some embodiments, it may be possible for piston 20 to block some of the heat generated inside liner 16 from passing through liner 16 to seal 30. For example, when piston 20 is at a TDC position, the portion of liner 16 adjacent seal 30 (and all portions of liner 16 below piston 20) may be shielded from the combustion heat by piston 20. Accordingly, the heat generated inside combustion chamber 22 at this time may not significantly affect the temperature at seal 30 (or the lower portions of liner 16). For this reason, controller 46 may be configured to determine a position of piston 20 relative to axially segmented portions of liner 16, and only apply the heat flux to portions of liner 16 that are exposed (e.g., located above piston 20) during use of the thermal model. In the disclosed example, the thermal model is a one-dimensional model used to determine a temperature at seal 30 for every degree of crank angle revolution by simulating heat transfer radially outward through the wall of liner 16. The thermal model may take into account known geometry and material property data about liner 16 (e.g., wall thickness, surface finish, air gaps, use of a liner cuff and associated breaks, geometry of any grooves holding seal 30, heat transfer coefficient, etc.) and known and measured information about coolant inside jacket 28 (e.g., heat transfer coefficient and coolant temperature).

Controller 46 may then track a time during which seal 30 is exposed to elevated temperatures (Step 450). In particular, controller 46 may divide a full temperature spectrum of engine 10 into a plurality of temperature ranges (e.g., 5° ranges), and selectively increment a duration of operational engine time that seal 30 is exposed to temperatures within each range. For example, controller 46 may create a first range of about 200-204°, a second range from 205-210°, etc. And each time that controller 46 determines that the temperature at seal 30 falls within one of these ranges, controller 46 may increment an amount of time spent at a temperature within that particular range.

Controller 46 may use the time tracked in each temperature range at step 450 to determine a damage count for seal 30 based on a damage model stored in memory (Step 460). In particular, for a particular design of seal 30, that seal 30 may have a durability that varies based on the time spent in a particular combination of each of the temperature ranges. The durability may represent an amount of damage that can be safely accumulated, as determined through lab testing. And based on an Arrhenius equation used for determining seal degradation and the actual time spent in each temperature range, controller 46 may be able to determine the damage count of seal 30. Controller 46 may be configured to compare the damage count of seal 30 to one or more design thresholds, to see if the damage count of seal 30 is approaching a design limit (Step 470). In one embodiment, controller 46 may continuously make this comparison. In other embodiments, controller 46 may only make this comparison when prompted to do so (e.g., by a service technician) or periodically, as desired. As long as the damage count remains below a design limit (Step 470:N), control may return to step 410.

However, when the damage count approaches the design limit (Step 470:Y), controller 46 may be configured to implement a corrective action (Step 480). The corrective action could include, among other things, causing a notice of the approach to be shown on display 48 or communicated to back office 54, causing a warning to be generated, causing service instructions to be provided, causing service of engine 10 to be automatically scheduled, and/or causing engine 10 to be derated or even shut down. In some instances, multiple design limits may be utilized at step 470, with increasingly severe corrective actions selectively implemented based on the design thresholds being incrementally crossed.

The disclosed system may have broad applicability. In particular, the system may be applicable to cylinder liner seals (and other types of engine seals), and may be useful during design and/or selection of seal 30 prior to use of seal 30 within engine 10. For example, the known data associated with and performance parameters measured from an existing engine may be used by controller 46 to simulate seal temperatures based on the combustion model, the heat flux model, and the thermal model. These simulated temperatures may then be used to design and/or select application-specific seals 30. In addition, the system may provide information regarding the damage count of seal 30, and the information may remain accurate as engine 10 wears (assuming the wear conditions are updated as known data in the memory of controller 46). In addition, the system may be useful across multiple configurations or platforms of engines.

It should be noted that the concepts described in connection with this disclosure represent imbedded machine technology used to calculate a current status (e.g., a damage count) of a particular type of engine component. As described above, the disclosed concepts can be implemented by way of instructions pre-loaded into an engine controller. The disclosed concepts may rely on real-time information provided by one or more engine sensors in order to calculate the current status of the related components. The disclosed concepts do not necessarily involve predictions of future status changes of the engine components, and are not intended to represent a general data analytic platform.

The disclosed concepts can be used during development of the engine components based on historic engine data, if desired. In particular, the disclosed concepts can be used to determine the status of the engine components given particular operating conditions. For example, based on a calculated damage count calculated for the engine components when exposed to the particular operating conditions, properties and/or geometry of the engine components can be changed so as to reduce the damage count for the same components exposed to the same operating conditions.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A control system imbedded within an engine having a cylinder liner disposed in a block and a seal located around the cylinder liner, the control system comprising:
   at least one sensor configured to generate a signal indicative of a combustion process occurring inside the cylinder liner; and
   a controller in communication with the at least one sensor and configured to:
      determine an amount of heat generated inside the cylinder liner based on the signal and a combustion model of the engine;
      determine a heat flux through the engine based on the amount of heat and a heat flux model of the engine;
      determine a temperature at the seal based on the heat flux and a thermal model of the cylinder liner;
      track a time at the temperature; and
      determine a damage count of the seal based on the time at the temperature.

2. The control system of claim 1, wherein the signal is indicative of at least one of a speed of the engine, a quantity of fuel being injected into the cylinder liner, a timing of the fuel being injected, a pressure of the fuel being injected, a flow rate of air entering the cylinder liner, a temperature of the air, and a pressure of the air.

3. The control system of claim 1, wherein the controller is configured to determine the damage count in real time.

4. The control system of claim 3, wherein the controller is configured to determine the damage count at a frequency of about 1 Hz.

5. The control system of claim 1, wherein the controller is configured to determine the damage count based on a damage model of the seal.

6. The control system of claim 5, wherein the controller is configured to use the damage model to integrate a time at temperature for a plurality of temperature ranges based on an Arrhenius damage equation.

7. The control system of claim 1, wherein the controller is further configured to selectively implement a corrective action based on the damage count and a design limit of the seal.

8. The control system of claim 7, wherein the controller is configured to generate a notice when the damage count exceeds a first percent of the design limit.

9. The control system of claim 8, wherein the controller is further configured to recommend servicing of the seal when the damage count exceeds a second percent of the design limit that is greater than the first percent.

10. The control system of claim 9, wherein the controller is further configured to automatically schedule servicing of the seal when the damage count exceeds a third percent of the design limit that is greater than the second percent.

11. The control system of claim 1, wherein the thermal model is a one-dimensional model representing heat flow radially outward from a center of the cylinder liner.

12. The control system of claim 1, wherein:
   the signal is a first signal;
   the control system further includes a coolant sensor configured to generate a coolant signal indicative of a temperature of coolant in contact with the seal; and
   the controller is configured to determine the temperature at the seal based further on the coolant signal.

13. The control system of claim 12, wherein the controller is configured to determine the heat flux through the engine based further on known material and geometry data of the cylinder liner, the block, and the coolant.

14. The control system of claim 1, wherein the controller is configured to determine the amount of heat generated inside the cylinder liner based further on a known compression ratio of the engine, a known bore diameter of the cylinder liner, a known stroke length of an associated piston, and an assumed mixing of fuel and air occurring inside the cylinder liner.

15. The control system of claim 1, wherein the controller is configured to:
   determine an average heat flux through the engine during a 720° crank-angle period of operation of the engine;
   determine the temperature at the seal based on the average heat flux; and
   determine the heat flux through the engine based on a known position of a piston within the cylinder liner during the 720° crank-angle period of operation of the engine.

16. The control system of claim 1, wherein the controller is further configured to determine a current status of the seal based on the damage count and a design limit.

17. A method of monitoring an engine by an imbedded control system, the method comprising:
   sensing at least one parameter of a combustion process occurring inside a cylinder liner of the engine;
   determining an amount of heat generated inside the cylinder liner based on the at least one parameter, a known compression ratio of the engine, a known bore diameter of the cylinder liner, a known stroke length of an associated piston, an assumed mixing of fuel and air occurring inside the cylinder liner, and a combustion model of the engine;
   determining a heat flux through the engine based on the amount of heat, known material and geometry data of the cylinder liner and the block, and a heat flux model of the engine;
   determining a temperature of coolant in contact with a seal disposed around the cylinder liner;
   determining a temperature at the seal based on the heat flux, a thermal model of the cylinder liner, and the temperature of the coolant;
   tracking a time at the temperature; and
   determining in real-time a damage count of the seal based on the time at the temperature and a damage model of the seal.

18. The method of claim 17, wherein the at least one parameter is at least one of a speed of the engine, a quantity of fuel being injected into the cylinder liner, a timing of the fuel being injected, a pressure of the fuel being injected, a flow rate of air entering the cylinder liner, a temperature of the air, and a pressure of the air.

19. The method of claim 17, wherein:
    determining the heat flux through the engine includes determining an average heat flux through the engine during a 720° crank-angle period of operation of the engine; and
    determining the temperature at the seal includes determining the temperature at the seal based on the average heat flux and a known position of a piston within the cylinder liner during the 720° crank-angle period of operation of the engine.

20. The method of claim 17, further including determining a current status of the seal based on the damage count and a design limit.

* * * * *